July 31, 1951     W. H. BENDALL     2,562,166

GEARBELT POWER TRANSMISSION

Filed May 23, 1945

INVENTOR.
Wilfrid H. Bendall.
BY E. W. Marshall

Patented July 31, 1951

2,562,166

UNITED STATES PATENT OFFICE 2,562,166

GEAR BELT POWER TRANSMISSION

Wilfrid H. Bendall, New York, N. Y.

Application May 23, 1945, Serial No. 595,388

12 Claims. (Cl. 74—233)

This invention relates to a gearbelt power transmission device and more particularly to devices for interconnecting the drive shafts of motors and machines over various distances, and for serving as a flexible member between drive gears and in gear type self-aligning shaft couplings.

A brief summary of the principal limitations of existing chain and belt drives and flexible couplings, and of the essential requirements in this field, will give greater point to the objects and advantages of the present invention.

With the typical power transmission chain comprising rigid, pin-jointed links, impact between the chain and sprocket teeth and fluctuation in the angular velocity ratio of the drive, caused by the rigid link articulation, are inherent operating defects. The chain pitch-line velocity must be kept relatively low and small link sizes must be used if objectionable noise, vibration and rapid wear are to be minimized, and positive lubrication and oil-tight enclosure are essential to ensure a reasonably durable drive. For similar reasons the link joint pins and bearing seats have to be hardened and ground, and the multiplicity of small parts which must be finished and assembled to close tolerances to achieve the essential pitch accuracy, make the ordinary power chain a relatively complicated and expensive mechanism.

These chains are also widely used as a floating element in shaft couplings, accommodating misalignment through the link and pin bearing clearances. This arrangement provides only a limited degree of flexibility, since the individual chain parts are substantially rigid. Such shaft couplings, therefore, do not efficiently counteract either compound misalignment or shock loads.

As is well known, the belt drive, comprising either flat belts or belts of trapezoidal cross-section engaging grooved pulleys, is widely employed where it is not essential to maintain a positive drive ratio between driving and driven shafts. But even where the fixed drive ratio is not required, and the greater compactness of the chain drive represents a definite advantage, the inherently smooth-running capacity and simple installation requirements of the belt drive frequently make it preferable to the former.

Apart from its non-positive characteristic a fundamental disadvantage of the simple flat belt drive is the need for relatively high initial tension, in order to produce effective driving friction between the belt and pulley surfaces. A further disadvantage is that the materials of which the belts are usually constructed have limited strength and unstable frictional coefficients, necessitating a drive of relatively large bulk for a given horsepower transmitting capacity. Belts with a trapezoidal cross-section operating in grooved pulleys work with considerably lower initial tension, utilizing the wedging action of the belt in the pulley groove to obtain a higher effective friction coefficient. But the increased radial thickness and greater flexural stiffness of such belts, by necessitating larger pulley diameters, offsets this advantage to the extent that no appreciable reduction in the bulk and weight of the drive is achieved. Rubbing action between the belt and pulley contact surfaces is increased also and the velocity ratio between the driving and driven pulley is liable to change owing to wear. Other special disadvantages of these belts are that for best efficiency they must be molded in one piece and very carefully matched for multiple belt drives.

Flat steel belting offers the greatest potential efficiency and economy, but the need for extremely accurate pulley alignment and the difficulty of devising a satisfactory joint in the thin steel of which the belts must be constructed, have prevented extensive use of this type of transmission belt.

The flexible shaft coupling, as indicated by the great diversity of types available, is an important element of modern power transmission machinery. This diversity of types can also be taken as an index of the varied and conflicting requirements and the difficulty of arriving at a broadly acceptable solution. Many so-called "flexible" couplings are not truly flexible in that they attempt to counteract misalignment through a relatively loose assembly of rigid parts. Such couplings achieve a small degree of kinematic flexibility only. They cannot efficiently counteract torsional impact, or damp out angular speed fluctuations and vibration. Nor can they absorb appreciable radial or angular shaft misalignment and endwise motion. The ability to efficiently counteract these combined effects, at increasing speeds and torques, is the difficult but essential requirement of the acceptable flexible coupling today.

Couplings that utilize resilient materials such as rubber, leather and various synthetic materials, are satisfactory only to the extent that these materials can successfully withstand continued flexure involving internal friction and heating. And since these materials are relatively limited in strength they result in couplings that are comparatively heavy and bulky for a given capacity.

Couplings with resilient metal members are more compact, having the advantage of inherently stronger material with more stable mechanical properties. It appears, however, that very few efficient and inexpensive flexible couplings of this type, able to cope with the combined and complex dynamic effects noted above, are available in a single unit.

It is, consequently, a primary object of this invention to provide efficient and economical methods of transmitting power between shafts, that avoid the shortcomings discussed in the foregoing summary.

A further object is to provide power transmission means in which the positive drive ratio advantage of chains is combined with the smooth-running, simple installation features of belt drives.

For these purposes the present invention uses a coil of uniformly corrugated strip material, forming, in effect, a jointless flexible gear, which is hereinafter termed the "gearbelt."

It is recognized that proposals for using corrugated strip material for power transmission purposes were advanced at least 60 years ago, as shown in United States Patent No. 376,975 issued to P. Adie, January 24, 1888. It does not appear, however, that these proposals were ever carried into practice, or that the problems relating to them were particularly well understood. No attempt was made to specify the most economical method of corrugation, or to solve the critical problems of efficiently combining and securing the multiple layers of a corrugated structure of this nature.

Another object of the present invention therefore, is to provide a practical method of constructing a multiple layer corrugated strip power transmission belt and, more specifically, to provide a belt of this description that can be used with equal efficiency for both positive and frictional engagement, with toothed drive gears and grooved pulleys respectively, permitting both types of drive wheel to be used in a given transmission.

A further object is to provide a gearbelt power transmission element with simple, conveniently removable means for securing the superimposed layers, permitting the gearbelt to be removed or replaced without requiring shaft or drive wheel removal, or drive center adjustment.

Another object is to provide a power transmission V-belt capable of withstanding relatively high transverse pressure whereby increased power can be efficiently transmitted through wedged frictional engagement with grooved pulleys, and for use with variable speed transmission units in which speed variation is obtained by changing the axial spacing of pre-loaded pairs of conical wheels to vary the effective engagement diameter.

Another object is to provide a positive power transmission drive belt in which parasitic friction between the co-operating parts is practically eliminated, or is so negligible that fluid lubrication and an oil-tight casing are not required for efficient and durable operation.

Other objects are to provide a gearbelt transmission element capable of engaging the drive wheels at high linear velocities without generating impact or excessive vibration, and able to transmit power between the co-operating drive wheels at a substantially constant angular velocity ratio.

A further object is to provide a gearbelt power transmission element conveniently adapted for interconnecting drive gears and the halves of gear type shaft couplings which can efficiently accommodate continuous shaft misalignment, at a fixed or variable angle, fluctuations of angular speed, torsional shocks and longitudinal float of the drive members while transmitting power.

Objects and advantages of this invention in addition to those set forth above will be apparent from the following specification and accompanying drawings, in which several embodiments of the invention are described and shown, the novel features of which are defined in the appended claims.

Referring to the drawings.

Figure 1:
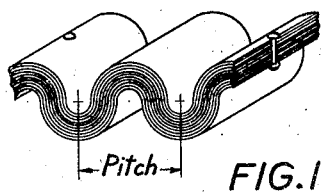
Figure 1 is a perspective diagram illustrating the principle of prior proposals for a power transmitting element comprising a plurality of individual, concentrically corrugated strips.

Early proposals for using corrugated strip material as a power transmission element recognized the need for a multiple layer structure if appreciable amounts of power were to be transmitted. Fig. 1 illustrates the ultimate form of this proposal and also illustrates its disadvantages. The belt was specified as comprising "superimposed-layers uniformly corrugated." This is partly erroneous as the corrugations are uniform for a single strip only. With the strips in contact with each other throughout their length as shown, the corrugations are concentric and necessarily have a common center, the radius of corrugation curvature varying for each superimposed strip. The corrugations of each layer have to be formed separately if the strips are to fit together on assembly as shown. Conversely, if all the corrugations are made to a given uniform radius and the strips are forced into conformity with each other when riveted together, an initial stress is imposed that lowers the permissible working load and the ultimate capacity of the belt, and may also overstress the corrugations.

With separate strips for each layer and the butted ends distributed throughout the belt length, the maximum load capacity of the assembly cannot be greater than that of half the total number of layers, unless a practical method of joining the butted ends of each strip is devised. This procedure would involve still greater technical difficulties and would not offset the other disadvantages. A further disadvantage is that the number of layers that can be used with a given corrugation pitch is limited by the space required between the outside corrugations, both for engaging the teeth of the drive gears and for the rivet heads securing the assembly. In any event the maximum permissible number of layers of a given thickness evidently cannot amount to a total thickness greater than half the corrugation pitch dimension. Carrying the assembly to this theoretical maximum would result in outer layers with impracticably sharp bend radii, and would cause early fracture of the material under the repeated flexure that is normally required of a drive belt.

Figure 2:
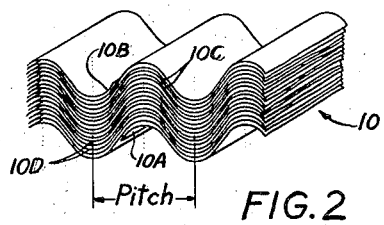
Figure 2 is a similar perspective diagram illustrating the principle embodied in the present invention, of the non-concentrically corrugated strip coil comprising the gearbelt element.

The diagram in Fig. 2 illustrates the improved corrugated strip construction that embodies the present invention. Uniform corrugations of the desired size are formed in a strip of suitable material. A power transmission gearbelt 10 is fabricated from this corrugated strip by making an initial coil of the required total corrugation pitch length and winding the material on itself, with loosely superimposed, meshing corrugations, until a belt of the required capacity, or allowable thickness for a specified minimum gear pitch-diameter, has been formed. The inner and outer ends, 10A and 10B, are then secured to the coil, as will be detailed in connection with the practical embodiments of this invention described later.

It will be observed that with this method of construction the superimposed corrugations have independent centers of curvature and are strictly uniform in both curvature and pitch throughout—and remain thus except when the belt is flexing to a given drive radius. The corrugated strips are in contact with each other only at the lines of tangency, designated 10C, or parts of the strip connecting the curved portions, designated 10D, and thus remain clear of each other at the latter portions. No attempt is made to force them into full contact or conformity with each other. Each layer comprising the strand of a power transmission gearbelt fabricated in this way is free from initial stress and will carry an equal share of the working tension between the drive wheels. The gearbelt formed thus is also substantially jointless and will evidently have the maximum possible strength for a given weight of material. The number of layers that can be used in this way, to form the gearbelt coil, is limited only by the available length of material and the allowable stress in the outermost strip when bending to a given minimum drive diameter. But within this limitation an increased number of layers, in direct proportion to a given increase in the minimum drive diameter, can be used. Doubling the diameter doubles the permissible number of layers and hence, the capacity of the drive, regardless of the corrugation pitch. The corrugation pitch dimension thus imposes no absolute limit on the number of layers and it will be seen that this method of fabricating a corrugated strip power transmission belt consequently presents definite technical and economic advantages not possessed by the earlier proposal.

Figure 3:
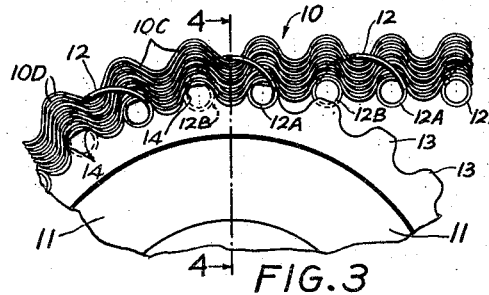
Fig. 3 is a fragmentary side elevation of the gearbelt engaging a toothed drive gear.
Figures 4, 5:
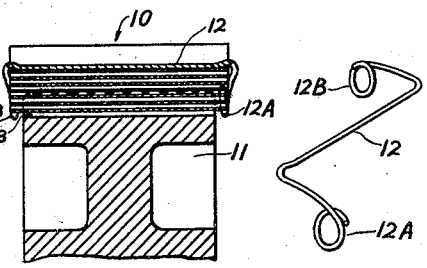
Fig. 4 is a transverse section of the parts shown in Fig. 3, the section being taken on the line 4—4 of the latter figure.
Fig. 5 is a perspective view of the wire clip used to secure the layers of the gearbelt coil and to retain it on the drive gear.

Figs. 3 and 4 illustrate a practical embodiment of this invention. The gearbelt 10, coiled from uniformly corrugated material of any convenient length, or multiple thereof, in accordance with the principles set forth above, is shown with its corrugations engaging the teeth of a drive gear 11. Spring wire clips 12, 12 secure the layers of the gearbelt and also serve to retain it against lateral creep on the gear rim. The perspective view of a clip in Fig. 5 shows its general form before it is sprung into position on the gearbelt. The ends of a length of wire with a straight portion equal to the gearbelt width are bent in opposite directions at a right angle to the straight portion and formed into loops 12A and 12B. The sectional view in Fig. 4 shows how the straight portion of the wire clip lies in the corrugation channel and extends across the width of the gearbelt and around its edges, with the looped ends 12A and 12B sprung into adjacent corrugation recesses on the under side at opposite edges of the belt. As shown in Fig. 4 the face width of the drive gear is made slightly smaller than the gearbelt width and the loops enclose the ends of the gear teeth at the rim during engagement therewith, providing a light, resilient retaining means for holding the belt on the gear.

The wire clips may be located at every third or fourth corrugation, or, for maximum security, may be used at every corrugation and are proportioned to exert a slight clamping pressure on the superimposed layers of the coil. They may be placed on either the outside or inside of the coil, or alternately on either side if both sides of the belt are used to engage drive gears.

Reverting again to Fig. 3, it will be seen that the corrugations of the gearbelt are in positive engagement with the teeth 13 of the drive gear and that their action in approaching the gear must be purely flexural, since the gearbelt structure itself is uniformly flexible. The characteristic lines of tangential engagement, 10C, between the superimposed corrugations of the gearbelt, are duplicated at the lines of tangential engagement, designated 14, with the teeth of the drive gear. This tangential, and thus, initially limited engagement between these members enables the drive to absorb shocks or other disturbing forces through the ability of the flexible gearbelt structure to both roll and deflect in response thereto, at the lines of engagement contact. Drive engagement thus proceeds by infinitely small angular increments, of combined flexural and rolling contact without impact or appreciable sliding, and since the belt conforms to a pitch circle of constant mean radius it will transmit power at a substantially constant angular velocity ratio. The transmission is nearly frictionless for these reasons. Even in flexing to the smallest practicable gear diameter the relative movement between the corrugations at the lines of contact is so slight and under such low pressure that the lubrication requirements are quite rudimentary. A film of dry, graphitic lubricant or a viscous grease applied during fabrication is all that would normally be required for operating for long periods of time. It will be obvious however, that where corrosive or abrasive conditions exist the gearbelt may readily be enclosed with other parts subject to a common lubricating system, where it will operate with no less efficiency.

Figure 6:
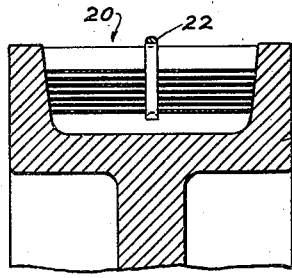
Fig. 6 is a fragmentary transverse section of the gearbelt engaging a grooved pulley and showing the gearbelt as modified for both positive and frictional engagement with drive wheels.
Figure 7:
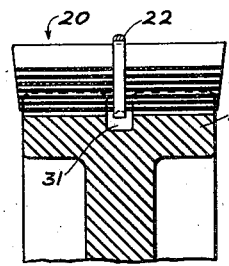
Fig. 7 is a similar transverse section showing the modified gearbelt of Fig. 6 engaging a toothed drive gear.

For power transmission with both toothed gears and grooved pulleys the gearbelt is modified by grinding or otherwise shaping the edges to an included angle corresponding to that of the pulley groove. Fig. 6 shows a gearbelt 20 modified in this manner, engaging grooved pulley 21. The corrugated coil comprising the gearbelt is secured by cotter-pins 22 passing through registering holes in the strip. This modification does not interfere with the use of the gearbelt for positive engagement with toothed gears as reference to Fig. 7 will make clear. Here the modified gearbelt is shown engaging toothed drive gear 30, provided with a circumferential slot 31, to clear the cotter-pins.

Figure 8:
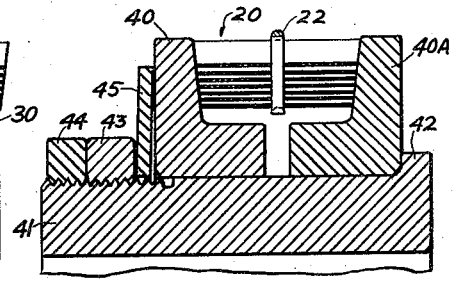
Fig. 8 is a transverse section of a pulley construction for maintaining a predetermined frictional driving pressure on the gearbelt.

It will be seen that a gearbelt modified in the foregoing manner can engage either type of drive wheel with equal facility. This feature makes the gearbelt transmission of great value and convenience for short-center high-ratio drives, which are of considerable economic importance. As is well known, such drives present the special difficulty that the arc of engagement on the smaller drive wheel is considerably less than on the larger one, and the power transmitting capacity is correspondingly reduced. This disadvantage can be readily overcome with the modified gearbelt by using a toothed drive gear giving positive engagement for the smaller wheel, and using a plain grooved larger wheel, where the increased arc of contact and the larger radius of curvature offer more favorable conditions for efficient frictional engagement.

Where it is desired to utilize the advantages of the gearbelt construction simply as a metal V-belt drive, using grooved pulleys and frictional engagement exclusively, the smaller pulley of a short-center high-ratio drive involves the identical problem noted above. The pulley construction illustrated in Fig. 8 is devised to ensure substantially equal small pulley efficiency in such cases. The pulley rim is composed of two like members 40, 40A with tapered faces opposed as shown to provide a groove for engaging the gearbelt. The rim members are spaced slightly apart and slidably keyed to hub 41 which is provided with a shoulder 42 at one end, and a threaded collar 43 secured by locknut 44 at the other end. A conical disc spring 45 is mounted between the threaded collar and rim member 40. It will be evident that by turning the collar and locking it in position so that the disc spring exerts constant pressure on rim member 40, the frictional force with which the gearbelt engages the groove is substantially increased and the pulley will thus transmit greater power than an ordinary grooved pulley of equal pitch-diameter under similar conditions. The transverse corrugations in the gearbelt, it will be noted, make it well adapted to withstand considerable edgewise pressure for this purpose.

Figure 9:
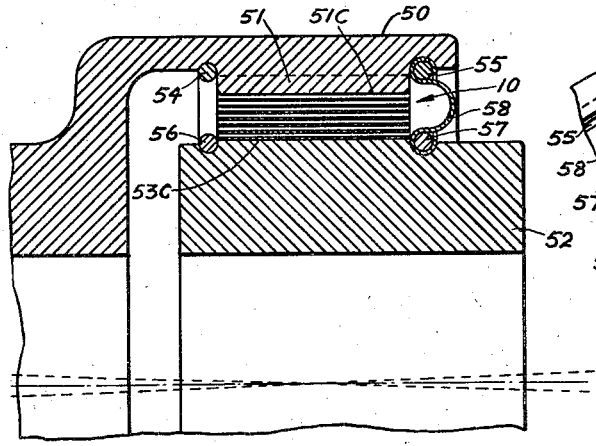
Fig. 9 is a fragmentary longitudinal section of a gear type shaft coupling embodying the gearbelt element.

A self-aligning shaft coupling using a coil of the gearbelt element as the resilient member is shown in Fig. 9. Flanged shaft hub 50 provided with internal gear teeth 51 at the inner periphery of the flange, comprises the outer member of the coupling. Shaft hub 52 provided with external gear teeth 53, forms the inner member of the coupling. A freely wound coil of the gearbelt element 10 is inserted in the annular space between the external and internal gear teeth of the two coupling members and meshes with the gear teeth. The coil is retained in the flanged outer hub member 50 by split rings 54 and 55 and is similarly retained on the inner hub member 52 by split rings 56 and 57. A flexible annular diaphragm 58, also secured to the two hub members by split rings 55 and 57, is provided to enclose the interior of the coupling and retain lubricant.

Figure 10:
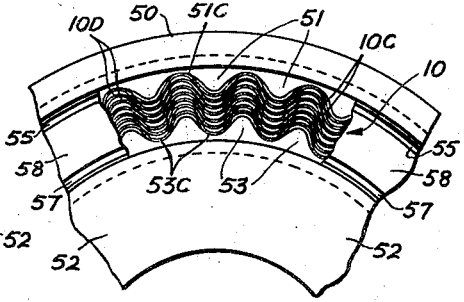
Fig. 10 is a fragmentary end view of the coupling in Fig. 9.

As shown in the end view in Fig. 10, the corrugations of the gearbelt element are initially in tangential engagement with the roots of the coupling gear teeth, designated 51C and 53C. The gearbelt corrugations also have this characteristic tangential contact with each other at portions designated 10C, between adjacent corrugations, and clearances at the curved portions 10D. When a drive torque is applied to either half of the coupling the load is transferred through these lines of contact to the other member of the coupling. In a properly proportioned and loaded coupling, constructed in accordance with this principle, such torque transference will result in moderate rolling and deflection of the gearbelt corrugations at these lines of contact and an increased tangential engagement contact with each other and with the gear teeth, proportional to the load transmitted, while still maintianing a residual working clearance between these cooperating members for resiliently absorbing torsional drive shocks.

In addition to providing torsional vibration dampening and flexibiilty the gearbelt coupling element will permit an appreciable amount of angular misalignment, as indicated by the dotted shaft-hub center lines. A considerable degree of endwise movement can also be accommodated since the concentric layers of the coil are free to move axially in either direction. The gearbelt coil can be assembled in the coupling with varying degrees of tightness, to give varying degrees of flexibility. Since a given total misalignment is equally divided between the layers of the coil the relative movement between adjacent layers is small, and by filling the interior of the coupling with a suitable lubricant the internal friction and wear can be kept to a very low value.

It will be evident from the foregoing specification that the basic gearbelt element, constructed in the manner described, can be utilized for a wide variety of simple, efficient and economical methods of mechanical power transmission, and that its adaptability to a number of functionally related products permits unusual manufacturing economies.

Applications and modifications of the gearbelt element are not limited to those described herein since other structural modifications of both the gearbelt and co-operating parts may evidently be made within the spirit and scope of this invention. For example, corrugated layers with corrugations of different amplitude and pitch may be combined in the same gearbelt structure if desired. This invention therefore, is not limited to the specific constructions that have been illustrated and described and has no limitations other than those imposed by the appended claims.

I claim:

1. A power transmission gearbelt comprising a continuous length of uniformly corrugated flexible sheet material coiled with loosely superimposed layers so that the individual corrugations have independent centers of curvature and flexure.

2. A power transmission gearbelt comprising uniformly corrugated flexible sheet material coiled with loosely superimposed layers so that the individual corrugations have independent centers of curvature and flexure.

3. A power transmission gearbelt comprising uniformly corrugated flexible sheet material coiled with loosely superimposed layers so that the individual corrugations have independent centers of curvature and flexure, and manually detachable means for securing the ends of the sheet material to said gearbelt.

4. A power transmission gearbelt comprising a length of uniformly corrugated flexible sheet material coiled with loosely superimposed layers so that the individual corrugations have independent centers of curvature and flexure, and means for securing said layers to each other.

5. A power transmission gearbelt comprising corrugated flexible sheet material coiled with loosely superimposed layers so that the individual corrugations have independent centers of curvature and flexure, the corrugated edges of the layers of said gearbelt being shaped for wedging engagement with a grooved pulley.

6. A power transmission gearbelt comprising corrugated flexible sheet material coiled with loosely superimposed layers so that the individual corrugations have independent centers of curvature and flexure, the corrugated edges of the layers of said gearbelt being shaped for wedging engagement with a grooved pulley, and means for retaining said layers in said gearbelt form.

7. Power transmission apparatus comprising a grooved pulley with a yieldable spring-loaded rim member of substantially constant drive pitch-diameter and a gearbelt comprising corrugated flexible sheet material corrugated to withstand high edgewise pressure and coiled to form an endless belt, the edges of said belt being shaped for driving engagement with said spring-loaded rim member.

8. A power transmission gearbelt comprising corrugated flexible sheet material with spaced holes therein coiled with loosely superimposed layers and registering holes so that the individual corrugations have independent centers of curvature and flexure, and means for retaining said layers inserted in said holes.

9. A power transmission gearbelt comprising corrugated flexible sheet material coiled to form an endless belt and detachable spring wire clips engaging the corrugations thereof for retaining said gearbelt form.

10. Power transmission apparatus comprising a toothed wheel engaging a gearbelt, said gearbelt comprising a coil of uniformly corrugated flexible sheet material coiled with freely superimposed registering corrugations in combined rolling and flexural contact with each other and with the teeth of said wheel, whereby said contacts vary with the load when transmitting power.

11. Power transmission apparatus comprising a toothed wheel engaging a gearbelt, said gearbelt comprising a coil of corrugated flexible sheet material with corrugations engaging the teeth of said wheel and means for retaining the gearbelt on the wheel comprising wire clips attached to the gearbelt extending outward therefrom to enclose the ends of said teeth when the gearbelt is engaging the wheel.

12. A power transmission gearbelt comprising uniformly corrugated flexible sheet material coiled with freely registering corrugations, said corrugations being shaped for combined rolling and flexural power transmitting contact with each other, and means for retaining said corrugations in said contact with each other.

WILFRID H. BENDALL.

REFERENCES CITED

The following references are of record in the file of this patent:

UNITED STATES PATENTS

| Number | Name | Date |
| --- | --- | --- |
| 376,975 | Adie | Jan. 24, 1888 |
| 1,017,819 | Sundh | Feb. 20, 1912 |
| 1,822,935 | Reeves | Sept. 15, 1931 |
| 1,828,136 | Freedlander | Oct. 20, 1931 |
| 2,214,541 | Siegling | Sept. 10, 1940 |

FOREIGN PATENTS

| Number | Country | Date |
| --- | --- | --- |
| 1,998 | Great Britain | 1858 |
| 116,054 | Australia | Oct. 23, 1942 |